United States Patent [19]

Yagishita et al.

[11] Patent Number: 4,650,834
[45] Date of Patent: Mar. 17, 1987

[54] VULCANIZABLE EPOXY GROUP-CONTAINING ELASTOMER COMPOSITION

[75] Inventors: Shigelu Yagishita; Kiyoshi Hosoya, both of Kawasaki; Tadaoki Okumoto; Masatoshi Sugimoto, both of Haruhi, all of Japan

[73] Assignees: Nippon Zeon Co., Ltd., Tokyo; Toyoda Gosei Co., Ltd., Aichi, both of Japan

[21] Appl. No.: 751,022

[22] Filed: Jul. 2, 1985

[30] Foreign Application Priority Data

Jul. 18, 1984 [JP] Japan .................................. 59-147443

[51] Int. Cl.⁴ .......................... C08L 23/26; C08F 8/14
[52] U.S. Cl. .................................... 525/386; 525/208; 525/327.3; 525/533
[58] Field of Search ...................... 525/386, 327.3, 533, 525/208

[56] References Cited

U.S. PATENT DOCUMENTS 3,781,379 12/1973 Theodore et al. ................... 525/386

Primary Examiner—Theodore E. Pertilla
Attorney, Agent, or Firm—Sherman & Shalloway

[57] ABSTRACT

A vulcanizable epoxy group-containing elastomer composition comprising an elastomer containing epoxy groups, a polycarboxylic acid having at least 2 carboxyl groups in the molecule, and either a quaternary ammonium salt or a quaternary phosphonium salt.

7 Claims, 6 Drawing Figures

VULCANIZABLE EPOXY GROUP-CONTAINING ELASTOMER COMPOSITION

This invention relates to a vulcanizable epoxy group-containing elastomer composition. More specifically, it relates to a vulcanizable epoxy group-containing elastomer composition which has excellent processing safety and storage stability for premature vulcanization, and gives vulcanizates having excellent mechanical properties, heat aging resistance and compression set.

It has been the usual practice to use polyamines, diamine carbamates, ammonium salts of organic carboxylic acids, and dithiocarbamic acid salts as vulcanization systems for epoxy group-containing elastomers. The use of polyamines or diamine carbamates, however, has the defect that because the rate of vulcanization is fast, the elastomers are liable to undergo scorching in the mixing and processing steps. When the ammonium salts of organic carboxylic acids or dithiocarbamic acid salts are used, elastomer stocks having stability to scorching can be obtained because the rate of vulcanization is relatively slow. But long post-vulcanization must be performed in order to obtain good compression sets.

Various vulcanization methods have been suggested in an attempt to remove these defects. For example, the specification of Japanese Laid-Open Patent Publication No. 145727/1980 discloses a vulcanization system comprising a phthalic acid anhydride and a specific imidazole compound for epoxy group-containing elastomers. The specifications of Japanese Laid-Open Patent Publications Nos. 177044/1982 and 177045/1982 disclose vulcanization systems comprising a guanidine compound and sulfur or a sulfur donor compound for epoxy group-containing elastomers. These vulcanization systems are stable to scorching, but have the defect of requiring post-vulcanization for long periods of time in order to obtain good compression sets.

It is an object of this invention to remedy these defects of the prior art.

The present inventors have made extensive investigations on various vulcanization systems in order to achieve this object, and consequently found that by using a polycarboxylic acid having at least 2 carboxyl groups in the molecule and a quaternary ammonium salt or a quaternary phosphonium salt as a vulcanizing agent for an epoxy group-containing elastomer, there can be obtained a vulcanizable composition which has excellent processing safety and storage stability for premature vulcanization and gives a vulcanizate having excellent mechanical properties, heat aging resistance and compression set.

According to this invention, there is provided a vulcanizable epoxy group-containing elastomer composition comprising an elastomer containing epoxy groups, a polycarboxylic acid having at least 2 carboxyl groups in the molecule, and either a quaternary ammonium salt or a quaternary phosphonium salt.

The epoxy group-containing elastomer used in this invention is an elastomer having epoxy groups as a vulcanization site, and includes epoxidized elastomers obtained by epoxidizing elastomers containing no epoxy group, and elastomers obtained by copolymerizing usually 0.1 to 10% by weight, preferably 0.3 to 3% by weight, of an epoxy group-containing monomer as a vulcanization site with 90 to 99.9% by weight, preferably 97 to 99.7% by weight, of at least one monomer containing a copolymerizable terminal vinyl or vinylidene group by known polymerization methods such as emulsion, suspension, solution or bulk polymerization.

Examples of the epoxy group-containing monomer used as a crosslinking site include glycidyl acrylate, glycidyl methacrylate, vinyl glycidyl ether, allyl glycidyl ether, and methallyl glycidyl ether. Of these, glycidyl acrylate and glycidyl methacrylate are preferred.

Examples of the monomers having a terminal vinyl or vinylidene group copolymerizable with the epoxy group-containing monomer are alkyl acrylates having 1 to 8 carbon atoms in the alkyl moiety such as methyl acrylate, ethyl acrylate, propyl acrylate, n-butyl acrylate, 2-ethylhexyl acrylate and n-octyl acrylate, and the corresponding methacrylates; alkoxyalklyl acrylates having 1 to 4 carbon atoms in each of the alkoxy and alkyl moieties such as methoxymethyl acrylate, methoxyethyl acrylate, ethoxyethyl acrylate, butoxyethyl acrylate and methoxyethoxyethyl acrylate; vinyl esters such as vinyl acetate, vinyl propionate and vinyl butyrate; vinyl ketones such as methyl vinyl ketone and ethyl vinyl ketone; vinyl aromatic compounds such as styrene, alphamethylstyrene and vinyltoluene; conjugated dienes such as butadiene and isoprene; alpha-monoolefins such as ethylene, propylene and 1-butene; vinyl monomers having a hydroxyl group such as beta-hydroxyethyl acrylate and 4-hydroxybutyl acrylate; vinyl and vinylidene monomers having a nitrile group such as acrylonitrile, methacrylonitrile and beta-cyanoethyl acrylate; and unsaturated amide monomers such as acrylamide and N-methyl methacrylamide. These monomers may be used singly or in combination.

Specific examples of the epoxy group-containing elastomer include epoxy group-containing acrylate copolymer elastomers, epoxy group-containing ethylene/vinyl acetate copolymer elastomers, epoxy group-containing ethylene/acrylate copolymer elastomers, epoxy group-containing ethylene/vinyl acetate/acrylate copolymer elastomers, epoxy group-containing ethylene/propylene copolymer elastomers, epoxy group-containing acrylate/acrylonitrile copolymer elastomers, epoxy group-containing butadiene/acrylonitrile copolymer elastomers, epoxy group-containing butadiene/styrene copolymer elastomers, and epoxy group-containing butadiene/acrylonitrile/acrylate copolymer elastomers.

These epoxy group-containing elastomers are vulcanized by using a vulcanization system comprising a polycarboxylic acid having at least 2 carboxyl groups in the molecule and either a quaternary ammonium salt or a quaternary phosphonium salt.

The polycarboxylic acid having at least 2 carboxyl groups in the molecule is usually selected from saturated and unsaturated aliphatic compounds, alicyclic compounds, aromatic compounds and low-molecular-weight polymers. The polycarboxylic acid used in this invention also includes a polycarboxylic acid anhydride.

The following are typical examples of carboxyl group-containing compounds which can be used in this invention.

Examples of the aliphatic compounds include malonic acid, succinic acid, glutaric acid, adipic acid, pimelic acid, azelaic acid, sebacic acid, octanedioic acid, dodecanedioic acid, tridecanedioic acid, tetradecanedioic acid, hexadecanedioic acid, octadecanediocic acid, tartronic acid, methyltartronic acid, methylmalonic acid, ethylmalonic acid, tetramethylsuccinic acid, 2,2'-dimethylsuccinic acid, malic acid, alpha-methylmalic acid, alpha-hydroxyglutaric acid, alpha-hydroxyadipic acid, oxosuccinic acid, 2-oxoadipic acid, acetylmalonic acid, 2-acetylglutaric acid, beta-hydroxyglutaric acid, maleic acid, citraconic acid, glutaconic acid, muconic acid, citric acid, tartaric acid, 1,2,3-propanetricarboxylic acid, 1,2,3-propenetricarboxylic acid, 1,3,5-pentanetricarboxylic acid, cystine, aspartic acid, glutamic acid, beta-hydroxyglutamic acid, iminodiacetic acid, nitrilotriacetic acid and ethylenediaminetetraacetic acid.

Examples of the alicyclic compound include cis-1,3-cyclopentanedicarboxylic acid, cis-1,4-cyclohexanedicarboxylic acid, 1,5-cyclooctanedicarboxylic acid and hexahydroterephthalic acid.

Examples of the aromatic compounds include phthalic acid, 3-methylphthalic acid, terephthalic acid, phthalonic acid, hydroxyterephthalic acid, hemipinic acid, benzophenonedicarboxylic acid, phenylsuccinic acid, trimellitic acid, pyromellitic acid and 7,8-diphenyltetradecanedicarboxylic acid.

Examples of the low-molecular-weight polymers include carboxyl-terminated-liquid polybutadiene, carboxyl-terminated liquid butadiene/acrylonitrile copolymer, and liquid butadiene/acrylonitrile copolymer having carboxyl groups in the molecular chain.

Examples of the polycarboxylic acid anhydride are malonic anhydride, succinic anhydride, glutaric anhydride, maleic anhydride, phthalic anhydride, trimellitic anhydride, pyrophosphoric anhydride, 1,2-cyclohexanedicarboxylic anhydride, and long-chain dibasic acid anhydrides such as octadecyldioic acid condensate. These examples are not limitative, however, and anhydrides of the above-exemplified polycarboxylic acids can all be used in this invention.

For good compression sets and low-temperature properties, aliphatic dicarboxylic acids and the anhydrides thereof are especially preferred among the polycarboxylic acids used in this invention.

The polycarboxylic acid may be added during or after the polymerization reaction for producing the elastomer, or may be added to the elastomer together with other compounding chemicals such as a filler by a kneader normally used in the rubber industry.

The polycarboxylic acid can be used in an amount of usually 0.1 to 30 parts by weight per 100 parts by weight of the epoxy group-containing elastomer. The proportion of the polycarboxylic acid relative to the epoxy group-containing elastomer specified above has been selected in view of the speed of vulcanization and the mechanical properties, compression set, etc. of the vulcanizates. If it is below the specified lower limit, the speed of vulcanization is drasticaly reduced, and a practical vulcanizate cannot be obtained. On the other hand, if it exceeds the specified upper limit, the speed of vulcanization becomes very small, and a practical vulcanizate cannot be obtained. The preferred proportion of the polycarboxylic acid is 0.1 to 20 parts by weight.

The quaternary ammonium salt and the quaternary phosphonium salt used in this invention are compounds represented by the following formula

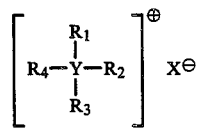

In the above general formula, Y is a nitrogen or phosphorus atom; $R_1$ to $R_4$ each represent a hydrocarbon group having about 1 to 25 carbon atoms such as an alkyl, aryl or alkylaryl group, or two or three of the groups $R_1$ to $R_4$ may form together with Y a heterocyclic ring wherein at least two ring atoms are carbon atoms and the remainder are oxygen, nitrogen, phosphorus or sulfur atoms; and X is an anion derived from an inorganic or organic acid in which acidic hydrogen is bonded to halogen or oxygen, preferably Cl, Br, I, $HSO_4$, $H_2PO_4$, $R_3COO$, $R_5OSO_3$, $R_5SO$ or $R_5OPO_3H$ ($R_5$ is the same hydrocarbon group as $R_1$ to $R_4$).

Specific examples of the quaternary ammonium salt include tetraethyl ammonium bromide, tetrabutyl ammonium chloride, tetrabutyl ammonium bromide, tetrabutyl ammonium iodide, n-dodecyltrimethyl ammonium bromide, cetyldimethylbenzyl ammonium chloride, methylcetyldibenzyl ammonium bromide, cetyldimethylethyl ammonium bromide, octadecyltrimethyl ammonium bromide, cetylpyridinium chloride, cetyl pyridinium bromide, 1,8-diaza-bicyclo(5,4,0)undecene-7-methyl ammonium methosulfate, 1,8-diazabicyclo(5,4,0)undecene-7-benzyl ammonium chloride, cetyltrimethyl ammonium alkylphenoxypoly(ethyleneoxy)ethyl phosphate, cetyl pyridinium sulfate, tetraethyl ammonium acetate, trimethylbenzyl ammonium benzoate, trimethylbenzylammonium p-toluenesulfonate and trimethylbenzyl ammonium borate.

Specific examples of the quaternary phosphonium salts include triphenylbenzyl phosphonium chloride, triphenylbenzyl phosphonium bromide, triphenylbenzyl phosphonium iodide, triphenylmethoxymethyl phosphonium chloride, triethylbenzylphosphonium chloride, tricyclohexylbenzyl phosphonium chloride, trioctylmethyl phosphonium dimethyl phosphate, tetrabutyl phosphonium, bromide, and trioctylmethyl phosphonium acetate.

These quaternary ammonium salts or quaternary phosphonium salts may be used singly or as a mixture of two or more. The amount of the quaternary ammonium or phosphonium salt is usually 0.1 to 10 parts by weight per 100 parts by weight of the epoxy group-containing elastomer. This range has been selected for the high vulcanization speeds and excellent processing stability and storage stability of the vulcanizable composition and the excellent mechanical properties and compression sets of vulcanizates. If it is below the specified lower limit, vulcanization hardly proceeds. On the other hand, if it exceeds the specified upper limit, the speed of vulcaniztion becomes extremely fast, and the processing stability and storage stability of the vulcanizable composition are reduced. The preferred range is 0.1 to 5 parts by weight.

The vulcanizable composition of this invention is prepared by mixing the epoxy group-containing elastomer with the aforesaid vulcanization agent and compounding chemicals normally used in the rubber industry, such as a reinforcing agent, a filler, a plasticizer, a stabilizer, and a processing aid, by an ordinary kneader such as a roll mill or a Banbury mixer. The composition is molded into a desired shape, and then vulcanized to form a final product. The vulcanization is carried out usually at a temperature of at least 120° C., preferably about 150° to 220° C., for about 1 to 60 minutes. Postvulcanization can be carried out at a temperature of about 150° to 200° C. for about 1 to 24 hours.

The vulcanizable epoxy group-containing elastomer composition of this invention is a novel and efficient composition which has excellent processing safety and storage stability for early vulcanization, and gives vulcanizates having excellent mechanical properties, heat aging resistance and compression sets. It has been thought that vulcanizable epoxy group-containing elastomer compositions require a relatively long period of post-vulcanization in order to obtain a good compression set. With the vulcanizable composition of this invention, however, a good compression set can be obtained even when it is press-cured for a short period of time. Accordingly, the post-vulcanization can be greatly shortened, or omitted.

Since vulcanizates of epoxy group-containing elastomers obtained from the vulcanizable composition of this invention have excellent heat aging resistance, weatherability, water resistance and compression sets, they can find wide applications in various sealing materials (gaskets, O-rings, packings, oil seals), various hoses, diaphragms, and various belts or rolls.

The present invention will be more specifically illustrated by the following Referential Example, Examples and the accompanying drawing.

In these examples, all parts are by weight.

In the accompanying drawings.

Figure 1:
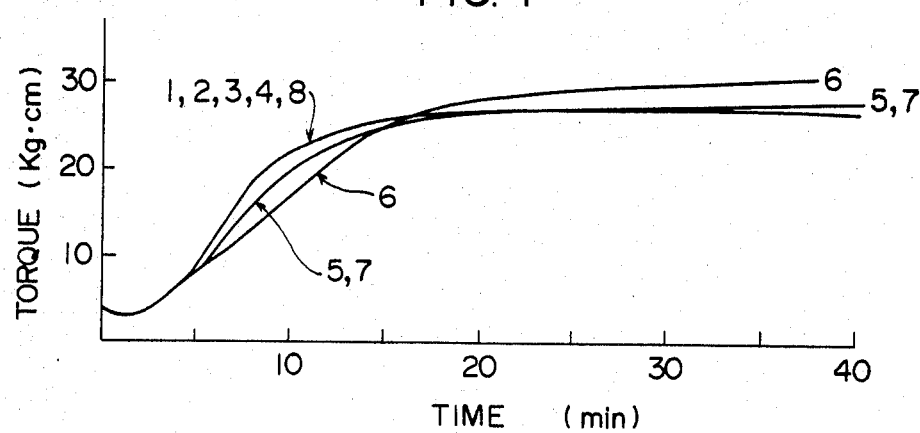
FIGS. 1 and 2 show cure curves of the compositions in Example 1 measured by an oscillating disk rheometer.

The numerals shown in these figures are run numbers.

REFERENTIAL EXAMPLE

Synthesis of epoxy group-containing elastomers:

In each run, each of the monomeric mixtures indicated in Table 1 was copolymerized in a 2-liter separable flask in accordance with the following polymerization recipes (I) and (II). First, the substances shown in (I) were charged into the flask, and the pH of the mixture in the flask was adjusted to 7. With stirring, the temperature of the mixture was adjusted to 5° C. Deaeration and nitrogen purging were repeated to remove oxygen from the flask sufficiently. Then, the substances shown in (II) were added, and the polymerization was started. The polymerization was terminated in about 10 hours. The polymerization conversion was 97 to 99%. After the polymerization, the polymerization product was salted out, fully washed with water, and dried under reduced pressure to obtain an epoxy group-containing acrylic elastomer.

The Mooney viscosities of the elastomers obtained are also shown in Table 1.

| Polymerization Recipe (I) | |
|---|---|
| Water | 1000 g |
| Sodium dodecylbenzenesulfonate | 20 g |
| Sodium naphthalenesulfonate | 10 g |
| Sodium sulfate | 3 g |
| Tetrasodium ethylenediamine-tetraacetate | 0.2 g |
| Ferric sodium ethylenediamine-acetate | 0.005 g |
| Monomeric mixture (Table 1) | 1000 g |
| Polymerization Recipe (II) | |
| Na$_2$SO$_4$ | 0.2 g |
| Sodium formaldehyde sulfoxylate | 0.2 g |
| p-Menthane hydroperoxide | 0.1 g |

TABLE 1

| | Acrylic elastomer | | |
|---|---|---|---|
| Monomers (parts) | A | B | C |
| Ethyl acrylate | 97.5 | 98 | 48 |
| Butyl acrylate | — | — | 30 |
| Methoxyethyl acrylate | — | — | 20 |
| Glycidyl methacrylate | 2.5 | — | 2 |
| Glycidyl acrylate | — | 2 | — |
| Mooney viscosity (ML$_{1+4}$, 100° C.) | 48 | 52 | 36 |

EXAMPLE 1

In each run, 100 parts of the epoxy group-containing acrylic elastomer A, 1 part of stearic acid, 50 parts of MAF carbon black (Seast 116, a trade name for a product of Tokai Carbon Co., Ltd.), and the various vulcanization agents shown in Table 2 in the amounts indicated were kneaded on a 6-inch roll mill to prepare a compound.

TABLE 2

| Run No. | | Vulcanizing agent | Amount (parts) |
|---|---|---|---|
| Invention | 1 | Succinic acid/Cetyltrimethyl ammonium bromide | 0.75/2 |
| | 2 | Glutaric acid/Cetyltrimethyl ammonium bromide | 0.85/2 |
| | 3 | Pimelic acid/Cetyltrimethyl ammonium bromide | 1.0/2 |
| | 4 | Azelaic acid/Cetyltrimethyl ammonium bromide | 1.2/2 |
| | 5 | Tetradecanedioic acid/Cetyltrimethyl ammonium bromide | 1.7/2 |
| | 6 | 1,3,5-Pentanetricarboxylic acid/Cetyltrimethyl ammonium bromide | 0.9/2 |
| | 7 | 7,8-Diphenyltetradecanedioic acid/Cetyltrimethyl ammonium bromide | 2.5/2 |
| | 8 | cis-1,4-Cyclohexanedicarboxylic acid/Cetyltrimethyl ammonium bromide | 1.1/2 |
| | 9 | Phthalic acid/Cetyltrimethyl ammonium bromide | 1.0/2 |
| | 10 | C-1000 (*1)/Cetyltrimethyl ammonium bromide | 10/3 |
| | 11 | CTBN (*2)/Cetyltrimethyl ammonium bromide | 12/3 |
| | 12 | DN-601 (*3)/Cetyltrimethyl ammonium bromide | 10/3 |
| | 13 | Phthalic anhydride/Cetyltrimethyl ammonium bromide | 0.9/2 |
| | 14 | SL-2OAH (*4)/Cetyltrimethyl ammonium bromide | 2.6/2 |
| | 15 | SL-2PAH (*5)/Cetyltrimethyl ammonium bromide | 2.6/2 |
| Comparison | 16 | 2-Methylimidazole/hexahydrophthalic anhydride | 0.2/1.0 |
| | 17 | Ammonium benzoate | 1.3 |

(*1): Carboxyl-terminated liquid polybutadiene (NISSO PB C-1000, a product of Nippon Soda Co., Ltd.).
(*2): Carboxyl-terminated liquid butadiene/acrylonitrile copolymer (Hycar CTBN, a product of B. F. Goodrich Co., Ltd.).
(*3): Liquid butadiene/acrylonitrile copolymer containing carboxyl groups in the molecular chain (Nipol DN601, a product of Nippon Zeon Co., Ltd.).
(*4): Octadecyldioic acid condensate (acid anhydride) (a product of Okamura Seiyu K.K.).
(*5): 7,8-diphenyl-tetradecanedicarboxylic acid condensate (acid anhydride) (a product of Okamura Seiyu K.K.).

Figure 2:
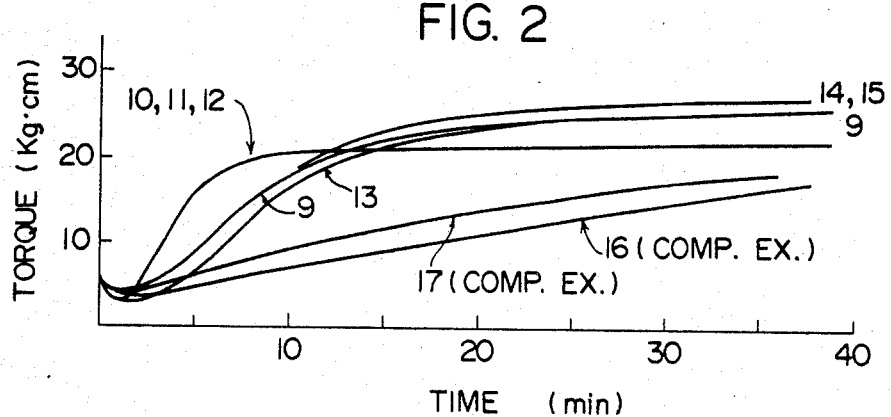

The Mooney scorch time was measured on the resulting compound, and then it was press-cured at 170° C. for 20 minutes. Thereafter, it was post-cured in a Geer's oven at 150° C. for 16 hours. The various properties of the cured products were measured in accordance with JIS K-6301. To judge the storage stability of the compound, its Mooney scorch time on standing for 2 weeks at room temperature was also measured. The results are shown in Table 3. FIGS. 1 and 2 show cure curves of the compounds measured by an Oscillating Disc Rheometer (made by Toyo Seiki K.K.; to be abbreviated as ODR hereinafter) at 170° C.

EXAMPLE 2

In each run, 100 parts of each of the epoxy group-containing acrylic elastomers shown in Table 4, 1 part of stearic acid, 50 parts of MAF carbon black and each of the vulcanization agents shown in Table 4 in the amounts indicated were kneaded on a 6-inch roll mill to prepare a compound.

TABLE 3

| Test Item | \multicolumn{15}{c}{Run No.} |
|---|---|---|---|---|---|---|---|---|---|---|---|---|---|---|---|---|
| | \multicolumn{15}{c}{Invention} | \multicolumn{2}{c}{Comparison} |
| | 1 | 2 | 3 | 4 | 5 | 6 | 7 | 8 | 9 | 10 | 11 | 12 | 13 | 14 | 15 | 16 | 17 |
| \multicolumn{18}{c}{Mooney scorch time (125° C.)} |
| $t_5$ (minutes) | 16 | 18 | 13 | 14 | 16 | 36 | 19 | 17 | 28 | 12 | 13 | 11 | 12 | 13 | 14 | 12 | 8 |
| $t_{35}$ (minutes) | 36 | 41 | 34 | 36 | 43 | 125 | 63 | 40 | — | 26 | 30 | 23 | 33 | 38 | 39 | 22 | 17 |
| Minimum viscosity | 46 | 50 | 50 | 51 | 46 | 44 | 45 | 47 | 43 | 40 | 36 | 38 | 51 | 48 | 47 | 47 | 52 |
| \multicolumn{18}{c}{Mooney scorch time (125° C.) after standing for 2 weeks at room temperature} |
| $t_5$ (minutes) | 17 | 19 | 14 | 14 | 17 | 38 | 20 | 19 | 30 | 13 | 15 | 13 | 18 | 15 | 15 | 8 | 7 |
| $t_{35}$ (minutes) | 39 | 44 | 37 | 35 | 45 | — | 66 | 45 | — | 28 | 37 | 25 | 46 | 42 | 45 | 16 | 14 |
| Minimum viscosity | 47 | 50 | 51 | 52 | 47 | 45 | 46 | 50 | 43 | 41 | 36 | 38 | 49 | 47 | 46 | 56 | 53 |
| \multicolumn{18}{c}{Properties after press-curing at 170° C. for 20 minutes} |
| Tensile strength (kg/cm$^2$) | 112 | 114 | 117 | 115 | 114 | 119 | 116 | 113 | 83 | 121 | 106 | 105 | 111 | 120 | 119 | 113 | 107 |
| Elongation (%) | 340 | 320 | 310 | 320 | 330 | 280 | 330 | 310 | 540 | 300 | 470 | 400 | 380 | 290 | 320 | 280 | 360 |
| 100% Tensile stress (kg/cm$^2$) | 42 | 46 | 47 | 45 | 46 | 55 | 41 | 45 | 21 | 38 | 23 | 33 | 36 | 51 | 50 | 49 | 36 |
| Hardness (JIS) | 68 | 68 | 69 | 68 | 69 | 68 | 67 | 68 | 63 | 62 | 56 | 59 | 67 | 71 | 70 | 69 | 68 |
| \multicolumn{18}{c}{Properties after post-vulcanization at 150° C. for 16 hours} |
| Tensile strength (kg/cm$^2$) | 135 | 140 | 143 | 145 | 142 | 148 | 149 | 138 | 128 | 153 | 144 | 146 | 135 | 133 | 136 | 159 | 138 |
| Elongation (%) | 220 | 210 | 210 | 220 | 220 | 170 | 230 | 220 | 260 | 160 | 170 | 180 | 230 | 200 | 210 | 150 | 270 |
| 100% Tensile stress (kg/cm$^2$) | 71 | 78 | 72 | 71 | 70 | 95 | 73 | 74 | 64 | 81 | 67 | 74 | 74 | 71 | 72 | 113 | 54 |
| Hardness (JIS) | 69 | 70 | 71 | 70 | 70 | 72 | 68 | 71 | 69 | 72 | 67 | 69 | 72 | 72 | 71 | 77 | 73 |
| \multicolumn{18}{c}{Properties after heat-aging at 175° C. for 70 hours (vulcanizate obtained by press curing at 170° C. for 20 minutes)} |
| Tensile strength (kg/cm$^2$) | 148 | 152 | 156 | 157 | 150 | 153 | 151 | 151 | 153 | 149 | | | 151 | 149 | 151 | 147 | 141 |
| Elongation (%) | 130 | 120 | 120 | 120 | 130 | 110 | 140 | 110 | 110 | 100 | | | 120 | 130 | 130 | 110 | 150 |
| Hardness (JIS) | 76 | 77 | 76 | 75 | 76 | 78 | 75 | 77 | 79 | 79 | | | 76 | 76 | 76 | 81 | 79 |
| \multicolumn{18}{c}{Compression set (150° C. × 70 hours; 25% compression)} |
| Vulcanizate obtained by press-curing at 170° C. for 20 min. (%) | 41 | 34 | 36 | 38 | 34 | 40 | 35 | 34 | 59 | 53 | 61 | 60 | 49 | 35 | 34 | 69 | 78 |
| Vulcanizate obtained by post-curing at 150° C. for 16 hours (%) | 28 | 22 | 26 | 24 | 21 | 31 | 23 | 22 | 40 | 37 | 39 | 39 | 28 | 22 | 21 | 63 | 52 |

These results show that the vulcanization systems in accordance with this invention have better scorch stability and vulcanization snappy property (the behavior whereby in a cure curve, the torque rises within a short time after vulcanization begins, and reaches a plateau value) than the vulcanization systems used heretofore (Comparative Examples 16 and 17). Even after standing for 2 weeks at room temperature, the compound shows a vulcanization behavior not much different from that of the compound immediately after preparation, and therefore, it has excellent storage stability. The conventional vulcanization systems give poor compression sets upon press curing at 170° C. for 20 minutes, and a good compression set cannot be obtained unless post-curing is performed for a long period of time. In contrast, the vulcanization systems in accordance with this invention give good compression set values even by press curing at 170° C. for as short as 20 minutes. This can allow omission of post-curing.

TABLE 4

| Run | Elastomer | Vulcanization agents | Amounts (parts) |
|---|---|---|---|
| 21 | B | Tetradecanedioic acid/ Cetyltrimethyl ammonium bromide | 1.7/2 |
| 22 | C | Tetradecanedioic acid/ Cetyltrimethyl ammonium bromide | 1.7/2 |
| 23 | C | 2-Methylimidazole/ Hexahydrophthalic anhydride | 0.2/1 |

Runs Nos. 21 and 22 are within the scope of the invention, and Run 23 is a comparison.

The compound was press-cured at 170° C. for 20 minutes, and then post-cured in Geer's oven at 150° C. for 16 hours. The properties of the cured product were measured in the same way as in Example 1, and the results are shown in Table 5.

TABLE 5

| Test Item | Run No. Invention 21 | 22 | Comparison 23 |
|---|---|---|---|
| Properties after press-curing at 170° C. for 20 minutes | | | |
| Tensile strength (kg/cm$^2$) | 112 | 101 | 83 |
| Elongation (%) | 370 | 280 | 320 |
| 100% Tensile stress (kg/cm$^2$) | 35 | 29 | 24 |
| Hardness (JIS) | 68 | 63 | 65 |
| Properties after post-curing at 150° C. for 16 hours | | | |
| Tensile strength (kg/cm$^2$) | 138 | 121 | 132 |
| Elongation (%) | 240 | 180 | 180 |
| 100% Tensile stress (kg/cm$^2$) | 57 | 45 | 80 |
| Hardness (JIS) | 69 | 66 | 73 |
| Compression set (150° C. × 70 hours; 25% compression) | | | |
| Vulcanizate obtained by press-curing at 170° C. for 20 minutes (%) | 38 | 41 | 78 |
| Vulcanizate obtained by post-curing at 150° C. for 16 hours (%) | 26 | 23 | 42 |

TABLE 6

| Run No. | | Vulcanization agent | Amount (parts) |
|---|---|---|---|
| Invention | 31 | Cetyl pyridinium bromide/Tetradecanedioic acid | 1/1.7 |
| | 32 | " | 2/1.7 |
| | 33 | " | 4/1.7 |
| | 34 | " | 2/5 |
| Comparison | 35 | " | 2/0 |
| | 36 | " | 0/1.7 |
| Invention | 37 | Cetyltrimethyl ammonium iodide/Tetradecanedioic acid | 1.5/1.7 |
| | 38 | Triphenylbenzyl phosphonium chloride/Tetradecanedioic acid | 3/1.7 |
| | 39 | Tetrabutyl phosphonium bromide/Tetradecanedioic acid | 1.5/1.7 |
| | 40 | Triphenylbenzyl phosphonium iodide/Tetradecanedioic acid | 1.5/1.7 |

TABLE 7

| Test Item | Invention 31 | 32 | 33 | 34 | Comparison 35 | 36 | Invention 37 | 38 | 39 | 40 |
|---|---|---|---|---|---|---|---|---|---|---|
| Properties after press-curing at 170° C. for 20 minutes | | | | | | | | | | |
| Tensile strength (kg/cm$^2$) | 91 | 113 | 110 | 73 | Vulcanization insufficient* | Vulcanization insufficient* | 122 | 93 | 118 | 120 |
| Elongation (%) | 430 | 350 | 360 | 630 | | | 290 | 450 | 320 | 290 |
| 100% Tensile stress (kg/cm$^2$) | 23 | 40 | 38 | 21 | | | 52 | 25 | 40 | 45 |
| Hardness (JIS) | 64 | 68 | 67 | 59 | | | 69 | 65 | 64 | 68 |
| Properties after post-curing at 150° C. for 16 hours | | | | | | | | | | |
| Tensile strength (kg/cm$^2$) | 149 | 140 | 137 | 115 | | | 146 | 141 | 137 | 146 |
| Elongation (%) | 220 | 230 | 220 | 350 | | | 200 | 250 | 190 | 180 |
| 100% Tensile stress (kg/cm$^2$) | 72 | 67 | 67 | 32 | | | 82 | 59 | 80 | 83 |
| Hardness (JIS) | 70 | 69 | 67 | 65 | | | 71 | 69 | 71 | 72 |
| Properties after heat-aging at 175° C. for 70 hours (vulcanizate obtained by press-curing at 170° C. for 20 minutes) | | | | | | | | | | |
| Tensile strength (kg/cm$^2$) | 152 | 147 | 148 | 144 | | | 152 | 137 | 142 | 154 |
| Elongation (%) | 140 | 140 | 130 | 120 | | | 130 | 210 | 130 | 120 |
| Hardness (JIS) | 76 | 75 | 74 | 78 | | | 76 | 74 | 76 | 76 |
| Compression set (150° C. × 70 hours; 25% compression) | | | | | | | | | | |
| Vulcanizate obtained by press-curing at 170° C. for 20 minutes (%) | 82 | 35 | 37 | 78 | | | 34 | 61 | 39 | 37 |
| Vulcanizate obtained by post-curing at 150° C. for 16 hours (%) | 25 | 23 | 27 | 45 | | | 20 | 26 | 29 | 28 |

*Since the compounds were not practical, vulcanizate were not prepared from them.

EXAMPLE 3

Figure 3:
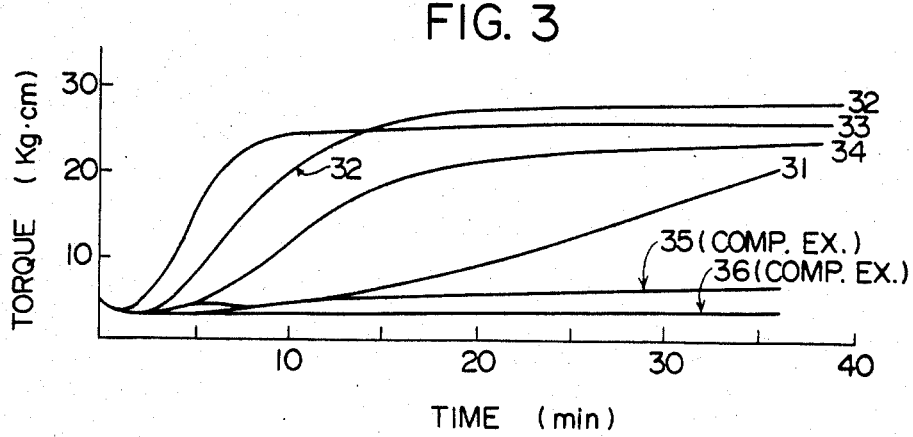
FIGS. 3 and 4 show cure curves of the compositions in Example 3.
Figure 4:
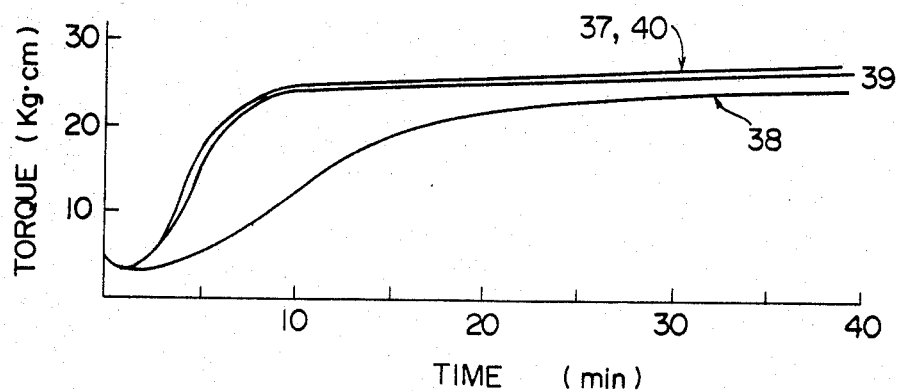

One hundred parts of the epoxy group-containing acrylic elastomer, 1 part of stearic acid, 50 parts of MAF carbon black and each of the vulcanization agents indicated in Table 6 in the amounts indicated were kneaded on a 6-inch roll mill to prepare a compound. The compound was press-cured at 170° C. for 20 minutes, and then post-cured in a Geer's oven at 150° C. for 16 hours. The properties of the cured product were measured in the same way as in Example 1. The results are shown in Table 7. The cure curves of the compositions at 170° C. were measured by ODR, and are shown in FIGS. 3 and 4.

These results demonstrate that the increasing of the amount of the quaternary ammonium salt increases the speed of curing; the addition of an excessive amount of the polycarboxylic acid retards the speed of vulcanization and impairs the various properties of the resulting vulcanizate; and that if either one of the quaternary ammonium salt or the polycarboxylic acid is lacking (Comparative Runs Nos. 35 and 36), the degree of vulcanization did not rise, and the compositions were not practical.

It is also seen that the various quaternary ammonium salts and quaternary phosphonium salts can be used as the vulcanization system in accordance with this invention, and they are excellent in regard to vulcanization snappy property, vulcanizate properties and compression set.

EXAMPLE 4

One hundred parts of an ethylene/vinyl acetate/butyl acrylate/glycidyl methacrylate four-component copolymer synthesized by a known polymerization method [the composition (% by weight) determined from chemical shifts in $^{13}$C-NMR was 18 ethylene, 39 vinyl aceteate, 42 butyl acrylate and 1 glycidyl methacrylate], 1 part of stearic acid, 50 parts of MAF carbon black, and each of the vulcanization agents shown in Table 8 in the amounts indicated were kneaded on a 6-inch roll mill to prepare a compound.

The Mooney scorch time of the compound was measured, and it was cured in the same way as in Example 1. The various properties of the vulcanizate were measured.

Figure 5:
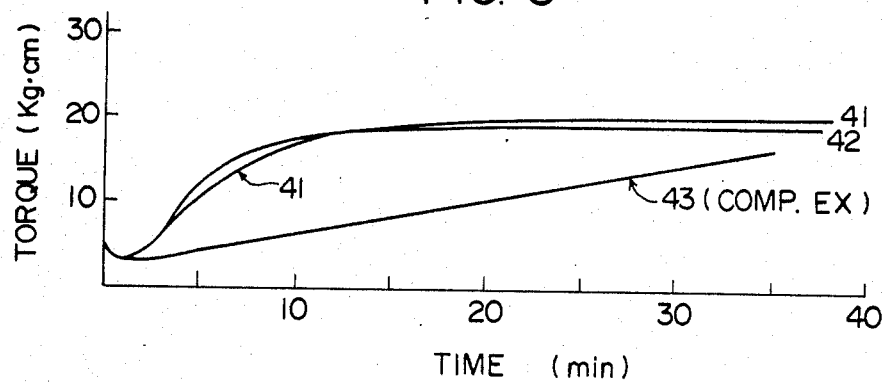
FIG. 5 shows cure curves of the compositions in Example 4.

The results are shown in Table 9. The cure curves of the compositions at 170° C. measured by ODR are shown in FIG. 5.

TABLE 8

| Run No. | Vulcanization agent | Amount (parts) |
|---|---|---|
| 41 | Cetyltrimethyl ammonium bromide/Tetradecanedioic acid | 1/1.5 |
| 42 | Tetrabutyl phosphonium bromide/Tetradecanedioic acid | 1.5/1.5 |
| 43 | 2-Methylimidazole/Hexahydrophthalic anhydride | 0.2/0.5 |

Runs Nos. 41 and 42 are within the scope of the invention, and Run No. 43 is a comparison.

TABLE 9

| | Run No. | | |
|---|---|---|---|
| | Invention | | Comparison |
| Test Item | 41 | 42 | 43 |
| Mooney scorch time (125° C.) | | | |
| t5 (minutes) | 19 | 13 | 12 |
| t35 (minutes) | 36 | 23 | 27 |
| Minimum viscosity | 45 | 47 | 46 |
| Properties after press-curing at 170° C. for 20 minutes | | | |
| Tensile strength (kg/cm$^2$) | 118 | 113 | 100 |
| Elongation (%) | 450 | 320 | 430 |
| 100% Tensile stress (kg/cm$^2$) | 33 | 37 | 30 |
| Hardness (JIS) | 68 | 64 | 68 |
| Properties after post-curing at 150° C. for 16 hours | | | |
| Tensile strength (kg/cm$^2$) | 141 | 135 | 138 |
| Elongation (%) | 320 | 190 | 250 |
| 100% Tensile stress (kg/cm$^2$) | 45 | 80 | 55 |
| Hardness (JIS) | 71 | 70 | 72 |
| Permanent compression set (150° C. × 70 hours, 25% compression) | | | |
| Tensile strength (kg/cm$^2$) | 147 | 144 | 146 |
| Elongation (%) | 230 | 120 | 190 |
| 100% Tensile stress (kg/cm$^2$) | 61 | 96 | 73 |
| Hardness (JIS) | 75 | 76 | 76 |
| Compression set (150° C. × 70 hours, 25% compression | | | |
| Vulcanizate obtained by press-curing at 170° C. for 20 minutes (%) | 39 | 42 | 68 |
| Vulcanizate obtained by post-curing at 150° C. for 16 hours (%) | 23 | 32 | 36 |

EXAMPLE 5

One hundred parts of a butadiene/acrylonitrile/glycidyl methacrylate terpolymer elastomer synthesized by a known polymerization method (composition by weight percent: butadiene 65, acrylonitrile 33, glycidyl methacrylate 2), 1 part of stearic acid, 40 parts of MAF carbon black, and each of the vulcanization agents shown in Table 10 in the amounts indicated were kneaded on a 6-inch roll to prepare a compound. The compound was press-cured at 160° C. for 20 minutes, and the properties of the vulcanizate were measured in the same way as in Example 1.

Figure 6:
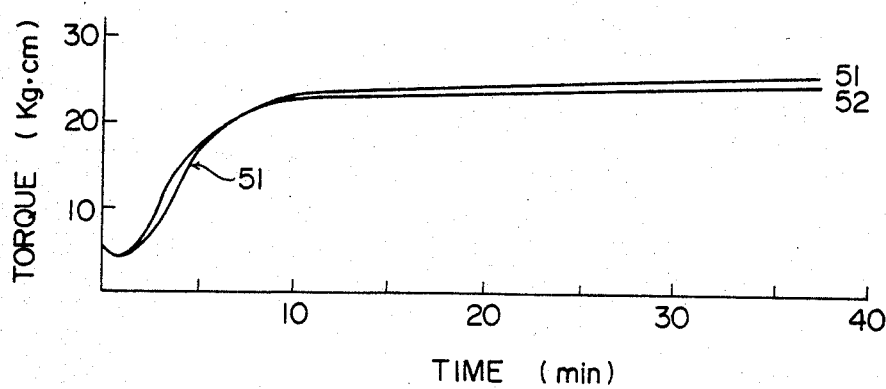
FIG. 6 shows cure curves of the compositions in Example 5.

The results are shown in Table 11. The cure curves of the compounds at 170° C. measured by ODR are shown in FIG. 6.

TABLE 10

| Run No. | Vulcanization agent | Amount (parts) |
|---|---|---|
| 51 | Cetyltrimethyl ammonium bromide/Tetradecanedioic acid | 2/2.2 |
| 52 | Tetrabutyl phosphonium bromide/Tetradecanedioic acid | 1.5/2.2 |

TABLE 11

| | Run No. Invention | |
|---|---|---|
| Test item | 51 | 52 |
| Properties after press curing at 160° C. for 20 min. | | |
| Tensile strength (kg/cm$^2$) | 143 | 142 |
| Elongation (%) | 340 | 360 |
| 100% Tensile stress (kg/cm$^2$) | 45 | 42 |
| Hardness (JIS) | 69 | 68 |
| Compression set (120° C. × 70 hours, 25% compression) | | |
| Vulcanizate obtained by press curing at 60° C. for 20 min. (%) | 12 | 13 |

What we claim is:

1. A vulcanizable epoxy group-containing elastomer comprising an elastomer having epoxy groups obtained by copolymerizing from 0.1 to 3% by weight of an epoxy group-containing ethylenically unsaturated monomer with 97 to 99.9% by weight of at least one monomer having a copolymerizable terminal vinyl or vinylidene group, a polycarboxylic acid having at least 2 carboxyl groups in the molecule, a quaternary compound selected from the group consisting of quaternary ammonium salts and quaternary phosphonium salts, and a processing aid.

2. The composition of claim 1 comprising 100 parts by weight of the elastomer, 0.1 to 30 parts by weight of the polycarboxylic acid, and 0.1 to 10 parts by weight of the quaternary ammonium or phosphonium salt.

3. The composition of claim 1 or 2 wherein the polycarboxylic acid is a polycarboxylic acid selected from aliphatic compounds, alicyclic compounds, aromatic compounds and low-molecular-weight polymers containing at least 2 carboxyl groups in the molecule, or an acid anhydride thereof.

4. The composition of claim 1 or 2 wherein the quaternary ammonium or phosphonium salt is a compound represented by the formula

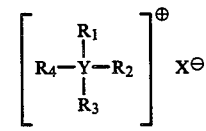

wherein Y is a nitrogen or phosphorus atom, each of $R_1$, $R_2$, $R_3$, and $R_4$ represents a hydrocarbon group, and two or three of these groups $R_1$ to $R_4$ may form together with Y a heterocyclic ring in which at least two ring atoms are carbon atoms and the remainder are oxygen, nitrogen, phosphorus or sulfur atoms, and X is an anion.

5. The composition of any one of claims 1 or 2 wherein the elastomer is an elastomer obtained by copolymerizing 0.3 to 3% by weight of an epoxy group-containing monomer with 97 to 99.7% by weight of at least one monomer having a copolymerizable terminal vinyl or vinylidene group.

6. The composition of claim 5 comprising 100 parts by weight of the elastomer, 0.1 to 20 parts by weight of the polycarboxylic acid and 0.1 to 5 parts by weight of the quaternary ammonium or phosphonium salt.

7. The composition of claim 4 wherein X is an anion derived from an inorganic or organic acid in which acidic hydrogen is bonded to a halogen or oxygen and is selected from the group consisting of Cl, Br, I, $HSO_4$, $H_2PO_4$, $R_3COO$, $R_5OSO_3$, $R_5SO$ or $R_5OPO_3H$ wherein $R_5$ is the same hydrocarbon group as $R_1$ to $R_4$.

* * * * *